Feb. 15, 1966 — L. C. BUTTERS — 3,234,958
VALVE FOR WASHING MACHINES
Filed July 5, 1963
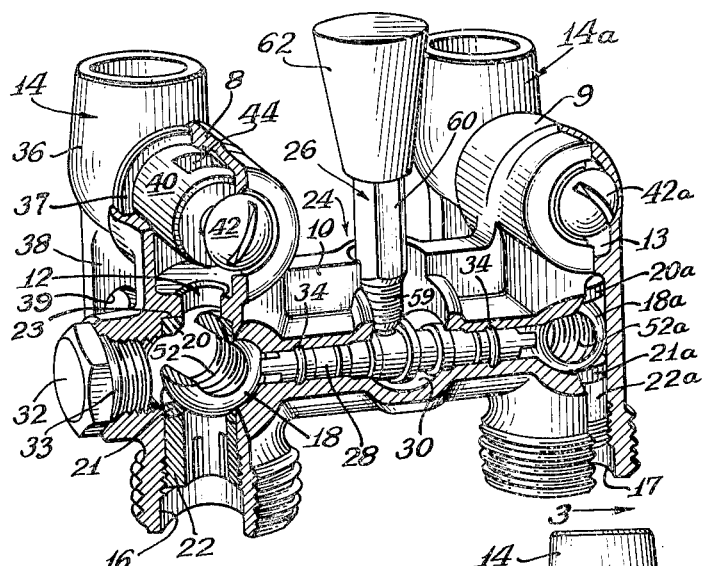
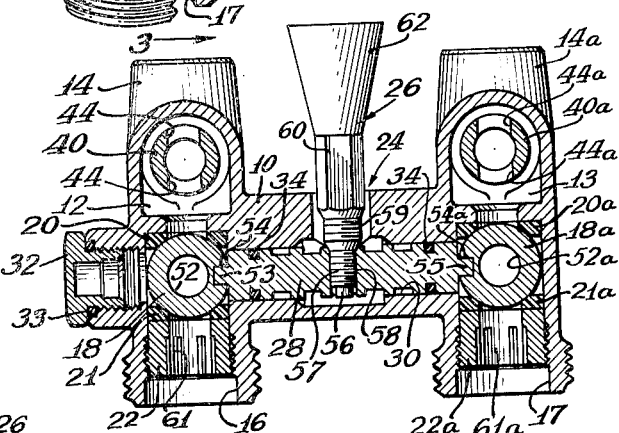
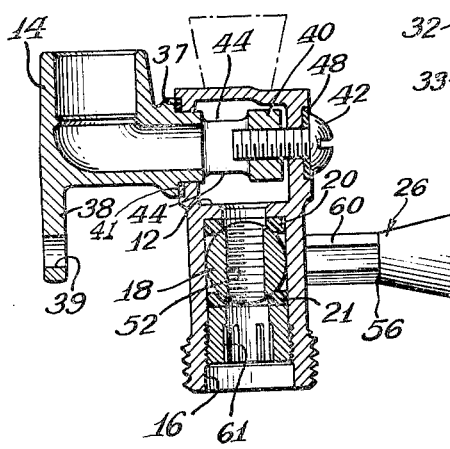
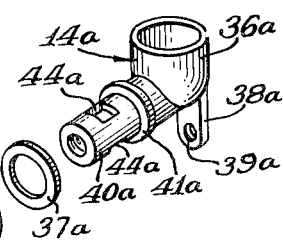
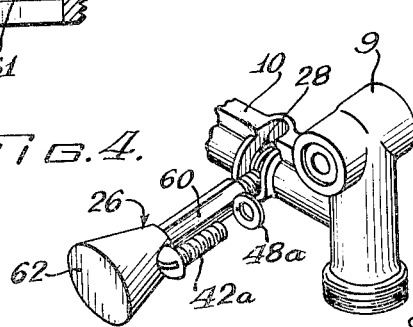
Inventor:
Lamont C. Butters
By Bair, Freeman
& Molinare
Attys.

United States Patent Office 3,234,958
Patented Feb. 15, 1966

3,234,958
VALVE FOR WASHING MACHINES
Lamont C. Butters, Lowell, Mass., assignor to Watts Regulator Company, a corporation of Massachusetts
Filed July 5, 1963, Ser. No. 292,894
4 Claims. (Cl. 137—328)

This invention relates to valves and, more particularly, to an improved dual valve for use with automatic clothes washers and like appliances which are adapted to be connected to hot and cold water lines.

Heretofore, it has been common to provide separate manually-operated valves in the respective hot and cold water lines connected to an automatic clothes washer or similar appliance. In an attempt to simplify operation and reduce expense, valves have been provided incorporating in a single valve body hot and cold water shut-off means actuated by separate levers. So far as I known, all such valves currently produced utilize a poppet-type closure member construction which has been found to be subject to undesirable wear and cutting of the valve seat. In addition, dirt may lodge on the valve seat, causing improper seating of the valve member which results in leakage. Such valves are usually removed from the hot and cold water lines for repairs and maintenance. Other valves while permitting maintenance without removal from the line are difficult to repair, and some require special tools for the purpose.

An object of the present invention is to provide, for automatic clothes washers and like appliances, an improved dual valve having self-cleaning ball-type closure means therein, the closure means each sealing between resilient annular compression rings.

It is a further object of the present invention to provide a dual valve having an actuating handle for simultaneously hoving the ball-type closure means, the actuating handle being constructed and arranged to serve as a tool for facilitating maintenance and repair of the ball-type closure means and valve seat without removal of the valve body from the hot and cold water lines.

A further object of this invention is to provide an improved shut-off valve having a ball-type closure member seating between a pair of compression rings disposed in the flow bore through the valve, the valve being provided with adjustable retaining means for maintaining the ball-type closure member in position and for adjusting the compression between the ball-type closure member and the compression rings.

Yet another object of this invention is to provide an improved shut-off valve including ball-type closure means having an opening therethrough, the opening being defined by a surface having means thereon cooperating with a tool adapted to be inserted into the opening for facilitating removal of the ball-type closure means from the valve body.

The foregoing and other objects of the invention will more clearly appear from the following detailed description of a preferred embodiment of the invention, particularly when considered in connection with the accompanying drawing, in which:

FIGURE 1 is a perspective view of a dual shut-off valve embodying the present invention, with parts broken away for clarity;

FIGURE 2 is a longitudinal cross-sectional view of the dual shut-off valve of FIGURE 1;

FIGURE 3 is a transverse cross-sectional view of the dual shut-off valve taken generally along line 3—3 of FIGURE 2; and FIGURE 4 is an exploded perspective view of a portion of the dual shut-off valve more clearly illustrating the conneceion of a mounting and connection member to the valve body.

Referring now to FIGURE 1, there is illustrated a perspective view of a dual shut-off valve embodying the present invention, with parts being broken away for clarity. The valve body 10 of the dual shut-off valve is integrally formed and is provided with a pair of flow bores 12 and 13 which extend therethrough. Provided in the inlets 8 and 9 of each of the flow bores 12 and 13 are inlet means to the valve body comprising mounting and connection members 14 and 14a. The outlets 16 and 17 from the flow bores are externally threaded so as to provide means for receiving hose connectors which are suitably connected to the automatic clothes washer or like appliance (not shown).

Closure means are provided in each of the flow bores 12 and 13 to regulate the flow of fluid through the valve body. Ordinarily, one of the inlet means will be connected to a source of hot water and the other inlet means will be connected to a source of cold water. To simplify the description, the components disposed within flow bore 12 will be described and equivalent elements in flow bore 13 will be designated with a corresponding number and the subscript a. The closure means 18 comprises a ball valve, made from a suitable rigid material, as for example, bronze, having an opening therethrough. The ball valve 18 is adapted to seat against valve seats both upstream and downstream thereof defined by annular pliable sealing discs or rings 20 and 21. Sealing disc 20 is seated against shoulder 23 defined in flow bore 12. The sealing discs are made from a suitable gasket material having a composition that provides a slippery or lubricated outer surface. One such preferred material is a polytetrafluoroethylene, as for example, Teflon.

The ball valve 18 is seated firmly between the discs 20 and 21 and retained in position by retaining member 22, which forces the components together so that disc 20 firmly engages shoulder 23. The retaining member 22 comprises a generally cylindrical part having external threads thereon adapted to cooperate with corresponding internal threads in the flow bore 12. The retaining member 22 is removable from the valve body to facilitate repair and maintenance of the components therein as will become hereafter more apparent. Further the retaining member 22 is adjustable within the flow bore to vary the compression between the ball valve 18 and the sealing discs 20 and 21 associated therewith and to compensate for wear between the ball valve and the discs 20 and 21. The ball valve cooperates with the durable sealing discs each time the ball valve is operated to wipe foreign matter therefrom so as to provide a self-cleaning, leakproof construction.

Actuating means 24 are provided for simultaneously actuating the ball valves 18 and 18a. Such actuating means comprise a handle member 26 secured to a shaft 28, which in turn is operatively connected to the ball valves 18 and 18a for simultaneously actuating such ball valves. As is evident in FIGURE 1, the shaft 28 is journaled in a transverse bore 30 defined in the valve body 10. The open end of transverse bore 30 is closed by a closure plug 32, which is adapted to seal against on O-ring 33. Fluid is confined within the flow bores 12 and 13 and prevented from moving into bore 30 along shaft 28 by means of O-rings 34 disposed in suitable peripheral recesses in shaft 28.

The mounting and connection means are comprised of a pair of L-shaped adaptors 14 and 14a each of which includes a connector part 36 adapted to be connected to a water supply line, a mounting flange 38 depending downwardly from the connector part, and an insert part 40 adapted to extend into the inlet to each flow bore. Flange 41 at the outer end of insert part 40 is adapted to abut adaptor gasket 37 to provide a seal between the interior of the inlet and the exterior of the associated insert part.

The L-shaped adaptors may be secured to the respective hot and cold water lines prior to assembly to the valve body 10. Then the adaptors are positioned at any angle within the inlets 8 and 9 to the flow bores 12 and 13, in whatever position is most convenient to accommodate the conduits for the hot and cold water. Each adaptor 14 and 14a is maintained in selected position by screw means 42 and 42a, respectively. Thus, it is seen that the adaptors provide means for connecting the valve body to the respective hot and cold water conduits. If desired, suitable fastening means may extend through an opening 39 in the depending mounting flange 38 for affixing valve body 10 to a support wall.

An important feature of the present invention is that handle member 26 may also be utilized as a tool for servicing the valve. Handle 26 comprises a rod-like central portion 56 having a threaded end portion 57 thereon for engaging with the threaded opening 58 in the control shaft. Adjacent to the threaded end portion 57 of handle 26 there is provided an external threaded portion 59 for cooperating with the threaded openings 52, 52a, respectively, in the ball valves 18, 18a, respectively.

Adjacent to the externally threaded portion 59 on the handle 26, there is provided a non-circular portion 60, preferably hexagonal, which is adapted to cooperate with the mating non-circular hexagonal interior surfaces 61 and 61a of the retainers 22 and 22a, respectively. The distal end of the handle 26 is provided with a grip 62 which may be made from plastic and suitably affixed to the end of the rod-like member 56.

Referring to FIGURE 2, there is more clearly shown the connection of the control shaft 28 to each of the ball valves 18, 18a. Within the exterior surface of each ball valve there is provided an elongated recess or groove 54, 54a, respectively, adapted to receive cooperating projections or end portions 53 and 55, respectively, of the control shaft. It is seen that the ball valves are not rigidly affixed to the control shaft and thus may be readily removed therefrom by sliding each ball valve from engagement with an associated projection on shaft 28.

FIGURE 3 is a cross-sectional view of the valve body taken generally along line 3—3 of FIGURE 2 illustrating the open position of a ball valve. In use, liquid will enter the L-shaped adaptor 14 and pass into inlet 8 through the openings 44 in insert part 40 of the adaptor. When the handle is in the upright position, the ball valve will prevent flow of liquid. Rotating the handle and the control shaft affixed thereto 90° opens the valve. Liquid will pass through the open ball valve and be discharged through the outlet 16. From the foregoing, it is believed clear that upon actuation of handle 26, the closure means may be moved simultaneously from closed position, through varying flow conditions, to full open position.

Referring now to FIGURE 4, there is illustrated a fragmentary perspective view of the dual shut-off valve embodying the invention. It is seen that a suitable adaptor gaskets 37a is disposed about the insert part 40a of adaptor 14a for sealing the adaptor with respect to the inlet of the valve body. It is also to be noted that a suitable screw gasket 48a is provided about the screw 42a for sealing the screw with respect to the face of the valve body. Provided in the lesser diameter portion of cylindrical insert part 40a of adaptor 14a are openings 44a which communicate the adaptor with the interior of the inlet. It will be apparent that adaptor 14a may be secured in any desired position within inlet 9 by screw 42a.

As aforenoted, the handle 26 may be utilized as a tool for servicing the dual shut-off valve. The end 57 of the handle 26 is externally threaded and cooperates with the threaded opening 58 in control shaft 28 for actuating shaft 28 to simultaneously actuate ball valves 18 and 18a.

Handle 26 may be disengaged from control shaft 28 and the cooperating parts 60 and 62 on the handle 26 and retaining member 22, respectively, may be engaged. Upon rotation of the handle 26 in a first direction, the retaining member 22 may be moved inwardly in flow bore 12 to increase the pressure between ball valve 18 and annular sealing discs 20 and 21 to compensate for wear therebetween.

Upon rotation of the handle 26 in the opposite direction, the retaining member 22 may be removed from the flow bore.

The portion 60 of handle 26 cooperates with the non-circular internal surface 61 of retainer member 22 and the externally threaded portion 59 of the handle engages the aligned threaded opening 52 in ball valve 18. Upon withdrawl of the handle 26, the end 53 of control shaft 28 will be released from recess 54 in the ball valve and the ball valve and sealing disc or gasket 21 may be withdrawn from the flow bore 12. It is necessary that force be applied to effect removal of the ball valve for otherwise the binding force between the gasket 21 and the interior of the flow bore would hinder removal of the ball valve. Thus, by use of the novel handle member, the dual shut-off valve can be conveniently and readily serviced.

By the present invention, there has been provided a novel dual shut-off valve for use with automatic clothes washers and like appliances which will increase the life of washing machine hoses and solenoid water valves associated with the clothes washers. The novel shut-off valve utilizes self-cleaning ball-type closure means which move quietly over the valve seats and permit a smooth, even flow of water to the automatc clothes washers. The ball-type closure members in the dual shut-off valve are simultaneously actuated by a single actuating member. The dual shut-off valve is provided with an all-purpose handle member which functions as a tool for servicing the valve. The valve also includes inlet means which may be positioned in any position to receive the ends of the hot and cold water supply lines.

It will be apparent to those skilled in the art that the invention can readily be applied to both manually actuated and automatically actuated valve structures. Further, the principles of the invention can readily be utilized in a mixing or proportioning valve. This may be accomplished by connecting the ball valves to the control shaft such that the axes of the opening in the ball valves are rotated 90° with respect to one another. As the ball valves are simultaneously actuated by the handle member, one will open as the other is closed and the flow of hot and cold water will be proportioned. The two outlets from the valve body could be connected to a single line by an external manifold or the valve body could be fabricated with internal flowways connecting to a single outlet.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A dual valve comprising a valve body having a pair of flow bores therethrough, each communicating at one end with an inlet and at the other end with an outlet, closure means comprising a ball valve disposed in each flow bore for regulating the flow of liquid therethrough, said ball valves each having an opening therethrough and being movable from a first position preventing fluid flow to a second position permitting fluid flow, annular resilient sealing discs engaging both the upstream and downstream surfaces of each of said ball valves, each of said ball valves and the sealing discs associated therewith cooperating to render the ball valves self-cleaning in use, means for retaining said ball valves in said bores, actuator means comprising a shaft engaging with said ball valves for moving said ball valves simultaneously, and mounting and connection means disposed in each inlet and adjustably connected to said valve body for rotation about an axis extending through each inlet for selectively communicating each respective inlet to a source of fluid and for mounting said valve body.

2. A dual valve as in claim 1 wherein said mounting and connection means include a tubular adaptor having a threaded opening at one end and screw means extending through said valve body for engaging with said threaded opening to retain said adaptor in selected adjusted position.

3. A dual valve comprising a valve body having a pair of flow bores therethrough, each flow bore communicating at one end with an inlet and at the other end with an outlet, a ball valve disposed in each of said bores for regulating the flow of fluid therethrough, each of said ball valves having a threaded opening therethrough and being movable between a first position preventing fluid flow to a second position permitting fluid flow, annular sealing discs engaging each ball valve both upstream and downstream thereof, means for retaining said ball valves in said bores comprising a retaining member threadedly engaged in each of said flow bores, each retaining member having means defined thereon for facilitating rotation thereof, and actuator means in said valve body detachably connected to said ball valves for moving said ball valves simultaneously from said first position to said second position, said actuator means comprising a handle member having means thereon for cooperating with said means facilitating rotation of said retaining means and having threaded means for engaging with a threaded opening in a ball valve, whereby said handle member may be utilized as a tool for either removing a retaining member to remove one of said ball valves and associated sealing discs or tightening said retaining member in place within said flow bore to adjust the compression of the sealing discs on said one ball valve.

4. A dual valve as in claim 3, wherein each ball valve is provided with an elongated recess in the outer surface thereof and said actuator means includes a shaft having a projection on the end thereof constructed and arranged for detachable engagement in said recess.

References Cited by the Examiner

UNITED STATES PATENTS

| | | | |
|---|---|---|---|
| 1,533,745 | 4/1925 | Lorraine | 137—595 X |
| 1,559,706 | 11/1925 | Jennings | 285—61 X |
| 1,708,241 | 4/1929 | Schultheiss | 137—327 |
| 2,716,421 | 8/1955 | Bertrand | 137—327 |
| 3,009,681 | 11/1961 | Carter et al. | 251—333 X |
| 3,033,227 | 5/1962 | Goldman | 251—171 X |

ISADOR WEIL, *Primary Examiner.*

WILLIAM F. O'DEA, *Examiner.*